No. 715,275. Patented Dec. 9, 1902.
J. KOSTÁLEK.
FILTER.
(Application filed Mar. 20, 1902.)
(No Model.) 2 Sheets—Sheet 1.

Witnesses. Inventor.
Hiroshi Mori. Josef Kostálek
Ludwig Flemm by B. Singer
Att'y.

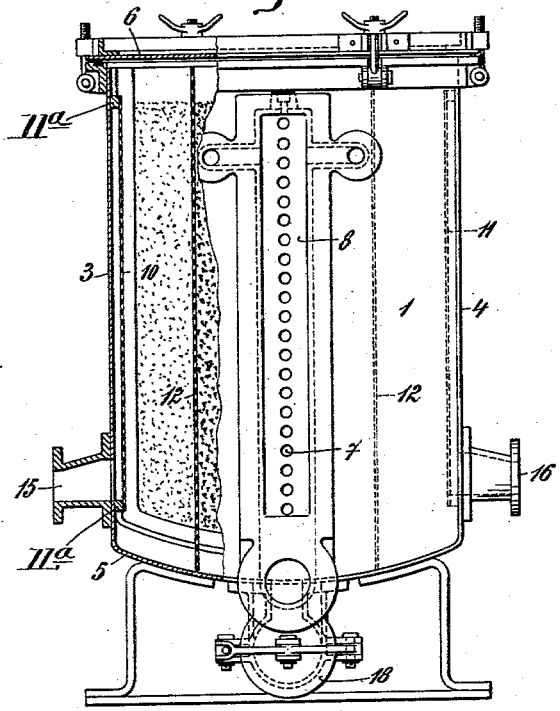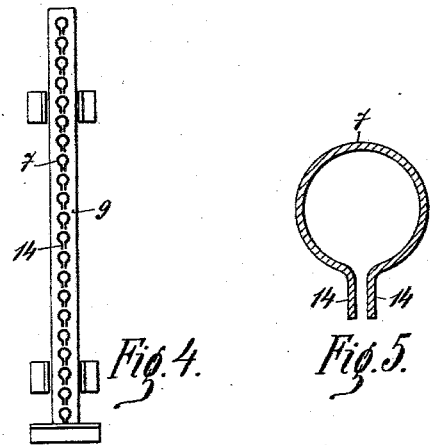

UNITED STATES PATENT OFFICE.

JOSEF KOSTÁLEK, OF VINOHRADY-PRAGUE, AUSTRIA-HUNGARY, ASSIGNOR TO SOCIETY MASCHINENBAU ACTIEN GESELLSCHAFT, VORMALS BREITFELD, DANEK & CO., AKVIOVA SPOLECNEST STROJIRNY DRIVE BREITFELD, DANEK A SPOL KARLIN, OF BOHEMIA, AUSTRIA-HUNGARY.

FILTER.

SPECIFICATION forming part of Letters Patent No. 715,275, dated December 9, 1902.

Application filed March 20, 1902. Serial No. 99,107. (No model.)

*To all whom it may concern:*

Be it known that I, JOSEF KOSTÁLEK, a subject of the Emperor of Austria-Hungary, residing at Vinohrady-Prague, in the Kingdom of Bohemia, Austria-Hungary, have invented a new and useful Filter, of which the following is a specification.

My invention relates to improvements in filters for juices and liquids in general; and the objects of my invention are, first, to provide artificial filters with large capacities for industrial purposes, and particularly for the purposes of sugar-factories and sugar-mills, where sugar-juices can be filtered after the requirement of such industries, either in open vessels or in covered vessels when they are working in highly-rarefied air; secondly, to provide filters with cheap filtering materials and media through which large quantities of liquids flow with constant or nearly constant velocities throughout the whole mass for the purpose of obtaining the highest filtering effect; third, to afford facilities for filling and emptying the filtering medium. I attain these objects by the mechanism illustrated in the accompanying drawings, in which—

Figure 1:
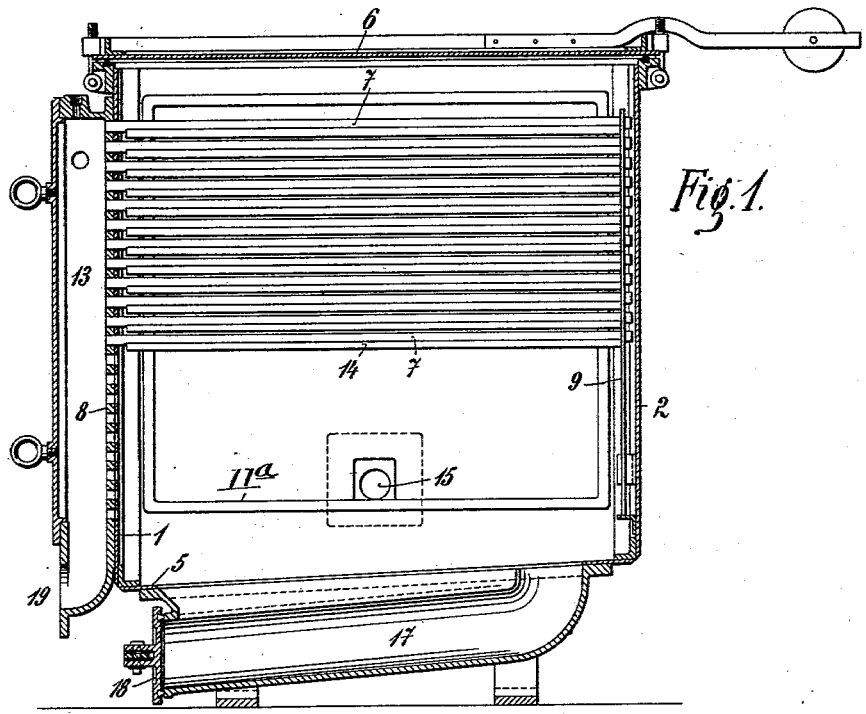
Figure 2:
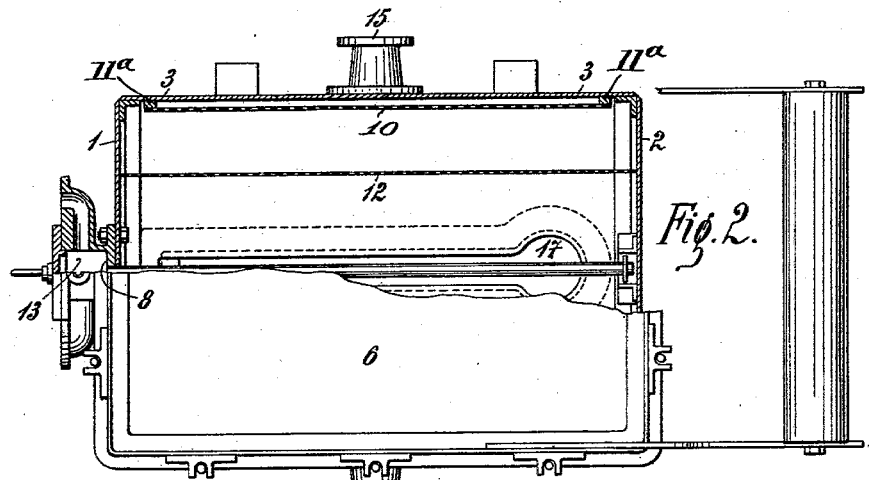

Figure 1 is a vertical longitudinal section through a filter embodying my invention with screens omitted. Fig. 2 is a top plan view of the filter, partly in horizontal section. Fig. 3 is a vertical transverse section through Fig. 1. Fig. 4 is a vertical transverse section through a single stack of tubes, and Fig. 5 is a transverse section of one of said tubes on an enlarged scale.

Similar numerals refer to similar parts throughout the several views.

1 2 3 4 is a reservoir with a horizontal or nearly horizontal bottom 5 and four vertical or nearly vertical walls. This reservoir is open on its top, or, in other cases, it is closed with a cover 6. There are a series of horizontal tubes 7 in the middle of this reservoir, placed one over the other, which are or may be open at both ends, by which they are fastened into vertical walls 8 and 9. To both sides of these tubes and near the side walls of said reservoir are placed two sieve-walls 10 and 11, and the reservoir-space between these sieves is filled with sand (see Fig. 3) or any other appropriate filtering medium, as the case may be. These sieves are attached to raised ribs $11^a$, leaving a space between them and the adjacent side walls in which the filtered fluid collects. It will be understood that other vertical or nearly vertical sieve-walls 12, &c., may be interposed between the sieve-walls 10 and 11 and the tubes 7, and the space between them may be filled with different kinds of filtering medium, so as to obtain different filtering strata, just as may be required in each special case.

The tubes 7 are split or provided with holes over their whole length. The liquid to be filtered enters by the open ends or by one end of said tubes and flows through the splits or holes of the tubes into the filtering-space and through the filtering medium and the sieves 10 11 12, &c., into the free space between the side walls and the sieves, leaving its sediments in the filtering medium. The trajectory of the liquid has everywhere the same velocity and the same direction, and by this reason its velocity in every filtering-point is practically constant, and therefore also as small as possible.

The openings of the tubes into the filtering-space are preferably placed on the bottom part of their surface to avoid the incumbrance of sand or the particles of the filtering medium. The drawings show the well-known split tubes, Fig. 5, which are for the same reason turned with their splits 14 downward.

The drawings show tubes 7, which are open only at one end, the liquid flowing into them on the open end only. All tubes are fed from one space 13, common to all of them, into which the filtering medium cannot enter. In some cases another such tubular vessel 13 is connected with the opposite ends of the tube as well, which in this case would be open, and the liquid flows into the tubes from both ends. This case is not represented in the drawings.

19 is the inlet for the liquid to be filtered.

15 and 16 are the outlets from whence the filtered liquid flows after having been freed from its sediments, which remain in the filtering medium or media in its or their different strata. The tubular vessel 13 is provided with a cover, which allows an easy cleansing of its contents.

The filtering-reservoir is provided under its bottom with a sewer-tube 17, which is inclined toward the outlet, which is closed by a stopper 18. As soon as this outlet is open the filtering medium flows out from the filter, which then may be cleansed and filled anew with fresh sand or any other appropriate filtering medium or media after shutting up the outlet. In thus drawing off the sand the central chamber between sieves 12 will first be emptied, when these sieves can be readily removed, allowing the chambers on either side thereof between said sieves and sieves 10 and 11 to discharge their contents.

In cases where the filter is interposed between two evaporating-batteries, as this occurs, for instance, in the sugar-factories, it works in strongly-rarefied air, and a cover 6 is needed, which must be perfectly air-tight.

I am aware that prior to my invention thereof different filters have been invented in which the liquids were led through the filtering medium or media which was or were contained in a filtering-space and divided into different filtering strata. I therefore do not claim such a combination broadly; but

What I claim as my invention, and desire to secure by Letters Patent, is—

1. The combination, in a filtering-reservoir, of a series of horizontal tubes having openings along their length, and located centrally of the reservoir, a filtering medium packed around said tubes and wholly covering them, a fluid-chamber 13 opening into the ends of said tubes and from which the fluid is forced therethrough and into the filtering medium, vertical sieves 10, 11 arranged at the sides of the reservoir, free spaces cut off from the filtering medium thereby, and outlets 15, 16 leading from said free spaces.

2. The combination, in a filtering-reservoir, of a series of horizontal tubes having openings along their length and located centrally of the reservoir, a fluid-feed chamber 13 opening into the ends of said tubes; vertical sieves 10, 11 arranged at the sides of the reservoir, free spaces between said sieves and the adjacent walls of the reservoir, fluid-outlets leading from said spaces, intermediate parallel sieves dividing the reservoir into compartments, one of which includes the series of tubes, and filtering material filling all of said compartments including the compartments occupied by the tubes.

3. The combination, in a filtering-reservoir, of a series of horizontal tubes having openings along their length and located centrally of the reservoir, a fluid-feed chamber, 13, opening into the ends of said tubes, vertical sieves, 10, 11, arranged at the sides of the reservoir, free spaces between said sieves and the adjacent side walls of the reservoir, fluid-outlets leading from said spaces, intermediate parallel sieves dividing the reservoir into compartments, one of which includes the series of tubes, filtering material filling all of said compartments, and a plugged sewer-tube leading from the bottom of said reservoir, by means of which the filtering material may be let out.

In witness whereof I have hereunto set my hand in presence of two witnesses.

JOSEF KOSTÁLEK.

Witnesses:
LADISLAV VOJÁIEK,
ADOLPH FISCHER.